United States Patent [19]
Lien

[11] 4,023,699
[45] May 17, 1977

[54] CAP ASSEMBLY FOR MULTI-SIZE WELL CASINGS

[75] Inventor: Neil C. Lien, Evansville, Wis.

[73] Assignee: Baker Manufacturing Company, Evansville, Wis.

[22] Filed: Sept. 29, 1976

[21] Appl. No.: 727,711

[52] U.S. Cl. .............................. 220/3.8; 220/287; 220/327; 166/75 R; 174/81; 138/89

[51] Int. Cl.$^2$ .......................................... H02G 3/08

[58] Field of Search ................. 220/3.8, 287, 327; 166/75 R; 174/81; 138/89

[56] References Cited
UNITED STATES PATENTS

| | | | |
|---|---|---|---|
| 3,035,732 | 5/1962 | Baker | 220/3.8 |
| 3,473,573 | 10/1969 | Baker et al. | 138/89 |
| 3,606,074 | 7/1969 | Hayes | 220/287 X |

*Primary Examiner*—George T. Hall
*Attorney, Agent, or Firm*—Theodore J. Long; John M. Winter; Harry C. Engstrom

[57] ABSTRACT

A cap assembly for capping the upper ends of well casings of various diameters and associated electrical conduit and providing electrical cable passage therethrough from the conduit into the casing. The cap assembly has an electrical conduit adapter and a cap member with a main dome portion defining a casing chamber of generally circular cross-section and a dome extension portion defining an adapter chamber. The main dome and dome extension portions of the cap member have a stepped series of annular downwardly facing bearing lands of progressively smaller diameter formed therein about the periphery of the chambers for selective seating on the upper end of various sized well casings. The bearing lands have substantially straight sections converging away from the casing chamber. The adapter has an outer taper complimentary to the convergence of the straight sections of the bearing lands for selective seating of the bearing land sections on the adapter. The same selected one of the bearing lands in said cap member is engaged on both the well casing and the adapter. The adapter also has a lip portion with a bearing land segment engaged over the upper end of the well casing. Set screws clamp the cap member and adapter together on the well casing and electrical conduit.

4 Claims, 8 Drawing Figures

CAP ASSEMBLY FOR MULTI-SIZE WELL CASINGS

BACKGROUND OF THE INVENTION

This invention reates generally to well casing caps and more particularly to well casing caps providing for entry of electrical cable into the well casing. Such well casing caps are particularly suited for use with submersible pump type installations wherein it is necessary to provide for electrical cable entry, pump and valve supports, hangers, lift-outs, service access openings, and the like at the top of the well casing. While the well casing cap of the invention is primarily intended for use in association with submersible pump type installations, its application is not necessarily limited thereto.

The invention herein is an improvement in the well casing caps of the type shown in U.S. Pat. Nos. 3,035,732 and 3,473,573. While the caps shown in these patents are excellent caps, they fit only one size of well casing. Since well casings that are commercially available and generally in use vary from about four to six inches in diameter, the known caps must be made and stocked in several different sizes.

SUMMARY OF THE INVENTION

This invention comprises a well casing cap assembly of the type providing for entry of an electrical cable into the well casing wherein the unique construction of the cap member and electrical conduit adapter of the assembly allow them to be combined in a unique fashion so that the assembly can be used to cap well casings of different commercially available sizes.

The cap assembly can be dependably mounted on plain-end well casings of several different diameters while permitting easy removal of the cap member portion for access to the interior of the well casing to facilitate placement, removal and servicing of pumps, valves, fittings, and other parts of the drop-assembly commonly used in submersible pump or "pitless" installations.

The objects and advantages of this invention are accomplished by the novel construction and cooperation of the cap assembly parts. The cap assembly includes an electrical conduit adapter and a cap member with a main dome portion defining a casing chamber of generally circular cross-section and a dome extension portion defining an adapter chamber. The main dome and dome extension portions of the cap member have a stepped series of annular downwardly facing bearing lands of progressively smaller diameter formed about the periphery of the chambers for selective seating on the upper end of various sized well casings. The bearing lands have substantially straight sections converging away from the casing chamber. The adapter has an outer configuration complimentary to the taper of the straight sections of the bearing lands. The adapter is mated with the straight bearing land sections of the selected one of the bearing lands seated on the well casing and has a lip portion with a bearing land segment engaged over the upper end of the well casing. Set screws clamp the cap member and adapter together on the well casing and electrical conduit.

Further objects, features and advantages of this invention will be apparent from the following detailed description taken in conjunction with the accompanying drawings showing a preferred embodiment of the assembly for exemplification.

DESCRIPTION OF THE PREFERRED EMEBODIMENTS

Figure 1:
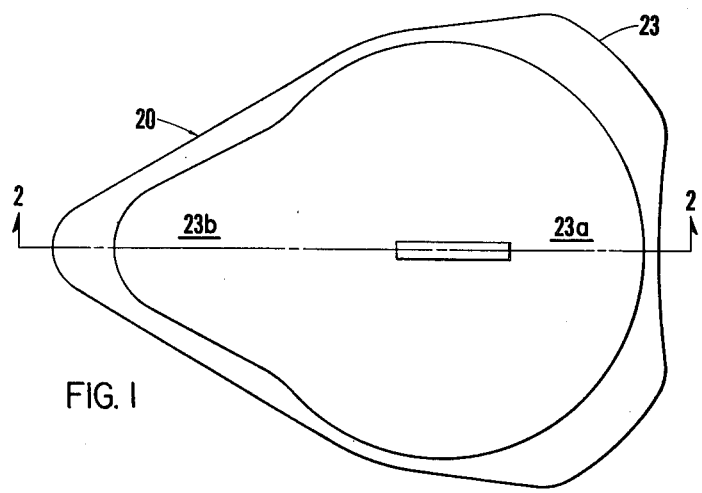
FIG. 1 is a top view of a cap assembly embodying the principles of this invention.
Figure 2:
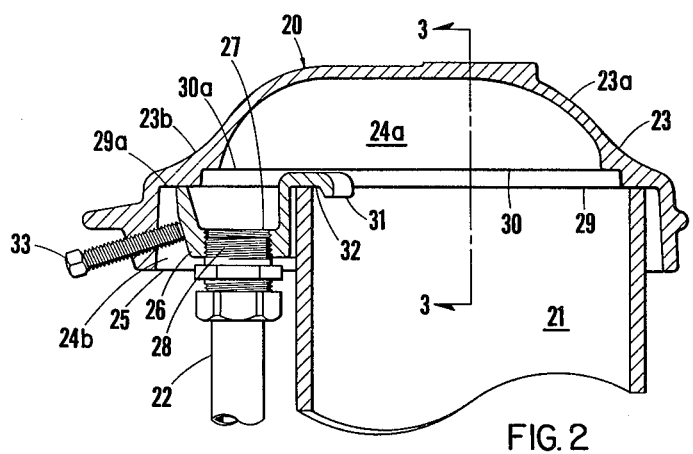
FIG. 2 is a sectional view along lines 2—2 of FIG. 1 showing the cap assembly mounted on a well casing and electrical conduit.
Figure 4:
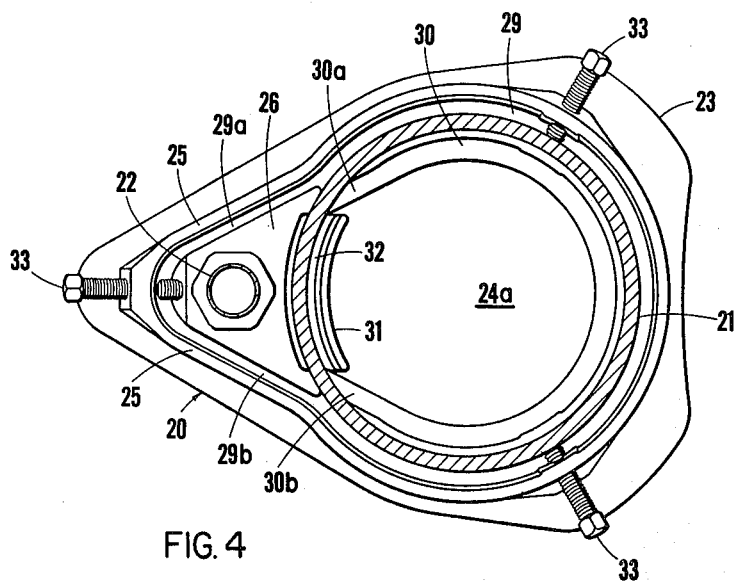
FIG. 4 is a bottom view section through the well casing showing the cap assembly of FIG. 2.
Figure 5:
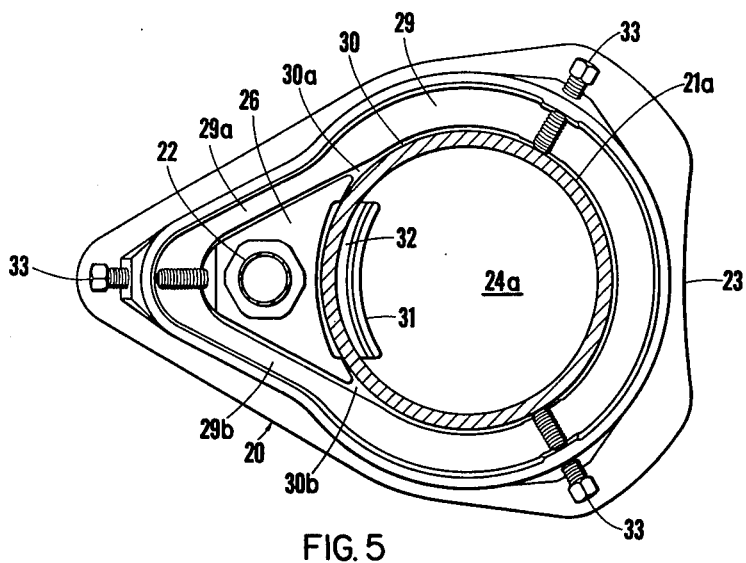
FIG. 5 is a bottom view section through a smaller diameter well casing showing the cap assembly of FIG. 2.

Referring now more particularly to the drawings wherein like numerals refer to like parts throughout the several views, the cap assembly is generally shown at 20 in FIGS. 1, 2, 4 and 5. In FIGS. 2 and 4 the assembly is mounted on a well casing 21 and electrical conduit 22 while FIG. 5 shows the same casing assembly 20 mounted on a somewhat smaller diameter casing 21a and electrical conduit 22. The cap assembly is designed to be mounted on well casings of varying commercially available sizes. While a cap assembly for capping well casings of only two diameters is shown in the drawings for exemplification, it should be understood that the cap assembly may be adapted for accommodating additional sizes of well casings without departing from the spirit and scope of the invention.

The cap assembly has a cap member 23 shown in FIGS. 1-4 having a main dome portion 23a defining a casing chamber 24a of generally cylindrical cross-section and a dome extension portion 23b defining an adapter chamber 24b. The adapter chamber has substantially straight sidewall sections 25 which converge away from the casing chamber as shown in FIG. 4. The casing chamber and adapter chamber are in open communication with each other to permit an electrical cable (not shown) to be run from the electrical conduit 22, through the adapter chamber and casing chamber, and downwardly into the well casing.

Figure 6:
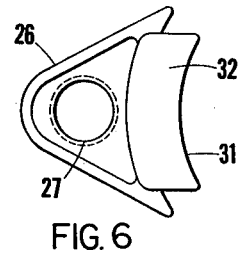
FIG. 6 is a top view of the electrical conduit adapter portion of the assembly.
Figure 7:
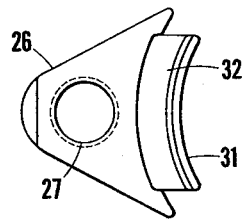
FIG. 7 is a bottom view of the electrical conduit adapter shown in FIG. 6.

As shown in FIGS. 2, 6 and 7 an electrical conduit adapter 26 has a threaded hole 27 for mounting the adapter on the upper end of electrical conduit 22 or a suitable connecter such as shown at 28 forming a part of the conduit.

The main dome portion 23a and dome extension portion 23b have a stepped series of annular downwardly facing bearing lands 29 and 30 of progressively smaller diameter formed therein about the periphery of the casing chamber and adapter chamber for selective seating on the upper end of various size well casings. A series of two is shown for exemplification, however, it is recognized that, if desired, more could be provided. The bearing lands 29 and 30 have substantially straight sections 29a and 29b and 30a and 30b, respectively, which have the same convergence or taper as the sidewall sections 25 of the adapter chamber. As best seen in FIGS. 4-7, the electrical conduit adapter has an outer taper which compliments and corresponds to the convergence of the straight sections of the bearing land sections to permit the bearing land sections to be selectively positioned on the adapter depending on the size of well casing being capped. As shown in FIGS. 2 and 5, the adapter is mated with the straight bearing land sections of the selected one of said bearing lands seated on the well casing. This construction and cooperation of the tapered electrical conduit adapter and the converging straight sections of the bearing lands permit the receipt of the adapter in the adapter chamber of the cap member in either an outer position shown in FIG. 4 to accommodate a larger diameter casing 21 or in an inner position as shown in FIG. 5 to accommodate a somewhat smaller size well casing 21a.

The electrical conduit adapter 26 has a lip portion 31 with an arcuate bearing land segment 32 engageable over the upper end of the well casing. As shown in FIG. 2, the bearing land segment lies in substantially the same plane as the selected one of the bearing land sections seated on the adapter. As shown in FIGS. 4 and 5, the arcuate bearing land segment of the adapter, together with a portion of that bearing land seated on the adapter, form a substantially continuous bearing land for seating on the upper end of the well casing.

Figure 3:
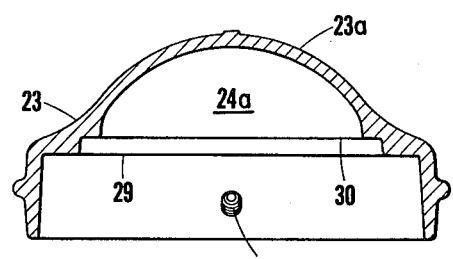
FIG. 3 is a sectional view taken along line 3—3 of FIG. 2 through the cap member of the assembly.

As illustrated in FIGS. 2, 3 and 4, tightening means in the form of set screws 33 (three shown) clamp the adapter 26 and cap member 23 in tight mating relation when the cap member is seated on the upper end of the well casing and the adapter is mounted on the electrical conduit.

As shown in FIG. 5, the same cap assembly can be utilized to cap an electrical conduit and a well casing 21a of smaller diameter than casing 21 shown in FIG. 2 by seating the smaller inside bearing land 30 of the cap member 23 on the well casing 21a and converging bearing land sections 30a and 30b on electrical conduit adapter 26. The set screws 33 in this case, must extend inwardly further to tighten the assembly. In this arrangement the arcuate bearing land segment 32 of the adapter forms with the bearing land 30, a substantially circular and continuous bearing land for engagement on the upper end of the well casing 21a.

Figure 8:
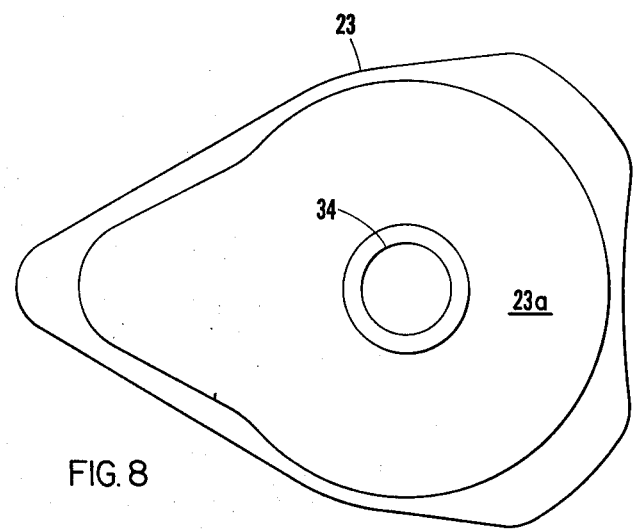
FIG. 8 is a top view of a modified form of cap member.

A modified form of the cap member 23 is shown at 23a in FIG. 8 wherein a hole 34 is provided through the main dome portion of the cap member opening into the casing chamber for venting, accessory connections, support, or the like.

It is understood that the invention is not confined to the particular construction or arrangement of parts herein illustrated and described, but embraces all such modifications thereof as come within the scope of the following claims.

I claim:

1. A cap assembly for capping the upper ends of a well casing and adjacent electrical conduit, said cap assembly comprising:
 a. a cap member having a main dome portion defining a casing chamber of generally circular cross-section and a dome extension portion defining an adapter chamber in open communication with said casing chamber;
 b. an electrical conduit adapter for mounting on the electrical conduit and being received within said adapter chamber;
 c. a stepped series of annular downwardly facing bearing lands of progressively smaller diameter formed in said main dome and dome extension portions about the periphery of said chambers for selective seating of the bearing lands on the upper end of various sized well casings;
 d. said bearing lands having substantially straight sections converging away from said casing chamber, and said electrical conduit adapter having an outer taper complimentary to the convergence of the straight sections of said bearing lands for selective seating of said bearing land sections on said electrical conduit adapter, said adapter mating with the straight bearing land sections of the selected one of said bearing lands seated on said well casing; and
 e. tightening means for clamping said adapter and said cap member in mating relation when said cap member is seated on the upper end of the well casing and said adapter is mounted on the electrical conduit.

2. The cap assembly as specified in claim 1 wherein said adapter has a lip portion with a bearing land segment engageable over the upper end of the well casing, said bearing land segment lying in substantially the same plane as the selected one of said bearing land sections seated on said adapter.

3. The cap assembly as specified in claim 2 wherein the bearing land segment on said adapter is arcuate so as to form, with a portion of that bearing land seated on said adapter, a substantially continuous bearing land for seating on the upper end of the well casing.

4. In a cap assembly for capping the upper ends of a well casing and adjacent electrical conduit wherein said cap assembly comprises, a cap member having a main dome portion defining a casing chamber of generally circular cross-section and a dome extension portion defining an adapter chamber in open communication with said casing chamber, an electrical conduit adapter for mounting on the electrical conduit and receivable within said adapter chamber and tightening means for clamping said adapter and cap member in mating relation when said cap member is seated on the upper end of the well casing and said adapter is mounted on the electrical conduit, the improvement comprising:
 a. a stepped series of annular downwardly facing bearing lands of progressively smaller diameter formed in said main dome and dome extension portions about the periphery of said chambers for selective seating of the bearing lands on the upper end of various sized well casings; and
 b. said bearing lands having substantially straight sections converging away from said casing chamber and said electrical conduit adapter having an outer taper complimentary to the convergence of the straight sections of said bearing lands for selective seating of said bearing land sections on said adapter, said adapter mating with the straight bearing land sections of the selected one of said bearing lands seated on said well casing.

* * * * *